(12) United States Patent
Gossweiler, III et al.

(10) Patent No.: US 8,136,167 B1
(45) Date of Patent: Mar. 13, 2012

(54) SYSTEMS AND METHODS FOR PROVIDING IMAGE FEEDBACK

(75) Inventors: Richard Carl Gossweiler, III, Sunnyvale, CA (US); Shumeet Baluja, Leesburg, VA (US); Maryam Kamvar, San Francisco, CA (US)

(73) Assignee: Google Inc., Mountain View, CA (US)

( * ) Notice: Subject to any disclaimer, the term of this patent is extended or adjusted under 35 U.S.C. 154(b) by 769 days.

(21) Appl. No.: 12/254,312

(22) Filed: Oct. 20, 2008

(51) Int. Cl.
*H04N 7/16* (2011.01)
(52) U.S. Cl. ............................ 726/27; 382/289; 382/296
(58) Field of Classification Search ...................... 726/27
See application file for complete search history.

(56) References Cited

U.S. PATENT DOCUMENTS

| | | | |
|---|---|---|---|
| 6,128,397 A | 10/2000 | Baluja et al. | |
| 6,195,698 B1 | 2/2001 | Lillibridge et al. | |
| 6,956,966 B2* | 10/2005 | Steinberg | 382/167 |
| 7,841,940 B2 | 11/2010 | Bronstein | |
| 7,891,005 B1* | 2/2011 | Baluja et al. | 726/26 |
| 2002/0141639 A1* | 10/2002 | Steinberg | 382/167 |
| 2004/0073813 A1 | 4/2004 | Pinkas et al. | |
| 2004/0199597 A1 | 10/2004 | Libbey et al. | |
| 2005/0014118 A1 | 1/2005 | von Ahn Arellano | |
| 2005/0065802 A1 | 3/2005 | Rui et al. | |
| 2005/0229251 A1 | 10/2005 | Chellapilla et al. | |
| 2006/0167874 A1 | 7/2006 | von Ahn Arellano et al. | |
| 2007/0130618 A1 | 6/2007 | Chen | |
| 2007/0201745 A1 | 8/2007 | Wang et al. | |
| 2008/0216163 A1 | 9/2008 | Pratte | |
| 2008/0244700 A1 | 10/2008 | Osborn et al. | |
| 2009/0113294 A1* | 4/2009 | Sanghavi et al. | 715/269 |
| 2009/0138468 A1 | 5/2009 | Kurihara | |
| 2009/0150983 A1 | 6/2009 | Saxena et al. | |
| 2009/0235178 A1 | 9/2009 | Cipriani et al. | |
| 2009/0249476 A1* | 10/2009 | Seacat | 726/17 |
| 2009/0319274 A1* | 12/2009 | Gross | 704/260 |
| 2009/0325696 A1 | 12/2009 | Gross | |
| 2009/0328150 A1* | 12/2009 | Gross | 726/3 |

FOREIGN PATENT DOCUMENTS

WO 2008/091675 A1 7/2008

OTHER PUBLICATIONS

Chellapilla, K., et al. "Computers Beat Humans at Single Character Recognition in Reading Based Human Interaction Proofs (HIPs)," in Proceedings of the 2nd Conference on Email and Anti-Spam, (CEAS) 2005.
Rowley, H., et al. "Rotation Invariant Neural Network-Based Face Detection," CMU-CS-97-201, Dec. 1997.
Fu, H., et al. "Upright Orientation of Man-Made Objects," SIGGRAPH 2008, 35th International Conference and Exhibition on Computer Graphics and Interactive Techniques, Aug. 2008.
Lopresti, D., "Leveraging the CAPTCHA Problem," 2nd Int'l Workshop on Human Interactive Proofs, Bethleham, PA, May 2005.
Rowley, H., et al. "Neural Network-Based Face Detection," IEEE Transactions on Pattern Analysis and Machine Intelligence, vol. 20, No. 1, Jan. 1998.

(Continued)

*Primary Examiner* — Sath V Perungavoor
(74) *Attorney, Agent, or Firm* — Brake Hughes Bellermann LLP

(57) ABSTRACT

A computer-implemented method may include receiving, over a network, an image from an image capture device, determining an image adjustment to the image, and communicating, over the network, the image adjustment to the image capture device.

14 Claims, 7 Drawing Sheets

OTHER PUBLICATIONS

Mori, G., et al. "Recognizing Objects in Adversarial Clutter: Breaking a Visual CAPTCHA," Proceedings of Computer Vision and Pattern Recognition, 2003.
Rui, Y., et al. "Characters or Faces: A User Study on Ease of Use for HIPs," Lecture Notes in Computer Science, vol. 3517, pp. 53-65, Springer Berlin, 2005.
Vailaya, A., et al. "Automatic Image Orientation Detection," IEEE Transactions on Image Processing, vol. 11, No. 7, pp. 746-755, Jul. 2002.
Baluja, S., et al. "Large Scale Performance Measurement of Content-Based Automated Image-Orientation Detection," IEEE Conference on Image Processing, vol. 2, pp. 514-517, Sep. 11-14, 2005.
Viola, P., et al. "Rapid Object Detection Using a Boosted Cascade of Simple Features," Proceedings of Computer Vision and Pattern Recognition, pp. 511-518, 2001.
Von Ahn, L., et al. "Telling Humans and Computers Apart (Automatically) or How Lazy Cryptographers do AI," Communications on the ACM, vol. 47, No. 2, Feb. 2004.
Von Ahn, L., et al. "CAPTCHA: Using Hard AI Problems for Security," Advances in Cryptology—EUROCRYPT 2003, Springer Berlin, 2003.
Von Ahn, L., et al. "Labeling Images With a Computer Game," Proceedings of the SIGCHI Conference on Human Factors in Computing Systems, ACM, pp. 319-326, Vienna, Austria, 2004.
Von Ahn, L., et al. "Improving Accessibility of the Web With a Computer Game," Proceedings of the SIGCHI Conference on Human Factors in Computing Systems, ACM, pp. 79-82, Montreal, Quebec, Canada, 2006.
Von Ahn, L. "Games With a Purpose," IEEE Computer, pp. 96-98, Jun. 2006.
Wu, V., et al. "Textfinder: An Automatic System to Detect and Recognize Text in Images," Computer Science Department, Univ. of Massachusetts, Nov. 18, 1997.
Wu, V., et al. "Finding Text in Images," Proceedings of the 2nd ACM Int'l Conf. on Digital Libraries, 1997.
Zhang, L., et al. "Boosting Image Orientation Detection With Indoor vs. Outdoor Classification," IEEE Workshop on Application of Computer Vision, pp. 95-99, Dec. 2002.
Adamchak, et al, "A Guide to Monitoring and Evaluating Adolescent Reproductive Health Programs", Pathfinder International, FOCUS on Young Adults, 2000, pp. 265-274.
Siegle, D., "Sample Size Calculator", Neag School of Education—University of Connecticut, retrieved on Sep. 18, 2008, from http://www.gifted.uconn.edu/siegle/research/Samples/samplecalculator.htm, 2 pages.
"Sampling Information", Minnesota Center for Survey Research—University of Minnesota, 2007, 4 pages.
U.S. Appl. No. 12/256,827, filed Oct. 23, 2008.
U.S. Appl. No. 12/254,312, filed Oct. 20, 2008.
U.S. Appl. No. 12/486,714, filed Jun. 17, 2009.
U.S. Appl. No. 12/345,265, filed Dec. 29, 2008.
U.S. Appl. No. 12/254,325, filed Oct. 20, 2008.
Non-Final Office Action for U.S. Appl. No. 12/254,325, mailed Sep. 1, 2011, 17 pages.
Non-Final Office Action for U.S. Appl. No. 12/606,465, mailed Aug. 19, 2011, 25 pages.
Shirali-Shahrea, Mohammad, "Collage CAPTCHA", IEEE, Computer Science Department, Sharif University of Technology, 2007, 4 pages.
Shirali-Shahreza, Mohammad, "Online Collage CAPTCHA", WIAMIS '07, Eighth International Workshop on Digital Object Identifier, 2007, 4 pages.
American Heritage Dictionary of the English Language (online), Fourth Edition, Copyright 2007 by Houghton Mifflin Co., "figure" definition, retrieved from http://www.credoreference.com on Aug. 13, 2011, 4 pages.
Non-Final Office Action for U.S. Appl. No. 12/345,265, mailed Oct. 14, 2011, 23 pages.

\* cited by examiner

SYSTEMS AND METHODS FOR PROVIDING IMAGE FEEDBACK

TECHNICAL FIELD

This description relates to providing image feedback.

BACKGROUND

Users take digital pictures at all zoom levels and from all angles. Sometimes, these digital pictures are taken such that the subject does not appear upright. In some cases this may be intentional, and in other cases this may not be intentional. Users also scan analog and/or digital items in order to create digital soft copies. Again, sometimes unintentionally, the analog and/or digital items may be scanned in at a slight tilt. Users may desire to take more accurate digital pictures of a subject.

SUMMARY

This document describes systems and techniques that may be used to provide image feedback to a user and/or to adjust images taken by the user. In general, an image capture device may capture an image and communicate the image over a network to a system that is configured to provide image feedback and/or image adjustments back to the image capture device. For example, a user may use a digital camera to capture an image of a subject. The image may be sent from the digital camera over a network such that the image is presented for display to multiple independent users, who may provide suggestions and/or adjustments to the image. The image adjustments and/or suggestions are communicated back to image capture device. In this exemplary manner, the user at the image capture device may receive substantially real time feedback on the image that they just captured enabling the user to adjust the image right away at the device or enabling the user to retake the picture of the subject taking into account the adjustments suggested by the group of independent users.

In certain implementations, image adjustments and suggestions may be accumulated over time such that a larger sample of independent users may weigh in on suggested image adjustments. Then, at a later time, the user of the image capture device can make adjustments to the image based on the accumulated feedback from a larger number of independent users.

Also, the image may be provided to multiple independent users and those users may be asked to reorient the image to a proper orientation. For example, the image captured by the image capture device may be skewed or tilted. The image may be presented to the independent users, in substantially real time, and those users may rotate the image to a proper angle. The reorientations of the independent users may be accumulated and statistically analyzed and an image adjustment may be communicated back to the image capture device, again in substantially real time. In some instances, the image may be presented to the independent users through accessing a service or a web site on the Internet. In other instances, the images may be presented to the independent users as part of an online game in an online game setting.

Also, the image adjustment provided back to the image capture device may include an actual angle correction and/or it may include an indicator such as, for example, a horizontal line or a frame, that shows the user how to adjust the camera to retake the picture. Or, it just may provide a message to the user that suggestions have been made to adjust the tilt of the image. If the user accepts the adjustment, then the image is corrected and saved in its corrected form at the image capture device. This may eliminate the need for the user to later correct images after they have been uploaded to a software program for editing images.

Also, other types of image adjustments and feedback may be provided from the independent users back to the image capture device. For example, the image adjustments may include changing camera settings such as the flash, changing locations, holding the camera for a portrait shot instead of a landscape shot, or vice versa, as well as other image adjustments and feedback.

A group of independent users may be preferred to sending the image over a network to a machine that is configured to make image adjustments, because it may be difficult in some circumstances for the machine to determine adjustments related to a proper orientation for the image. Humans may be more suitable and accurate at providing this feedback than a machine, especially if a statistically suitable sample of humans has been polled.

A confidence level related to the image adjustment and/or the other feedback may be provided to the image capture device so that the user has an indication as to the level of confidence in the corrections and suggestions being made by the independent users. For instance, a higher confidence level may be provided if the image was presented to a large number of independent users and the users had a uniformly consistent adjustment to the image. A lower confidence level may be provided if the image was presented to a smaller number of independent users and/or the users had non-uniform or scattered adjustments to the image.

According to one general aspect, a computer-implemented method includes receiving, over a network, an image from an image capture device, determining an image adjustment to the image, and communicating, over the network, the image adjustment to the image capture device.

Implementations may include one or more of the following features. For example, receiving the image from the image capture device may include receiving, over the network, the image from a camera, a mobile device having a camera, or a scanner.

In one exemplary implementation, determining the image adjustment may include calculating a correction angle for the image using an image aligner. Also, determining the image adjustment may include presenting the image to one or more independent users, requesting that the users make an adjustment to the image and calculating the image adjustment based on the adjustments of the one or more independent users.

In another exemplary implementation, determining the image adjustment may include calculating a first correction angle using an image aligner, presenting the image to one or more independent users, requesting that the users make an angle adjustment to the image, calculating a second correction angle using the angle adjustments of the one or more independent users, and calculating a final correction angle based on the first correction angle and the second correction angle. Communicating the image adjustment may include communicating the final correction angle to the image capture device.

In another exemplary implementation, determining the image adjustment may include presenting the image to one or more independent users, requesting that the users reorient the image, and calculating a correction angle based on the reorientations of the image by the one or more independent users. Communicating the image adjustment may include communicating the correction angle to the image capture device. Determining the image adjustment and communicating the image adjustment to the image capture device may occur in substantially real time. The computer-implemented method may further include receiving additional reorientations of the image from additional independent users, recalculating the correction angle to include the additional reorientations of the image from the additional independent users, and communicating the recalculated correction angle to the image capture device.

In another exemplary implementation, determining the image adjustment may include presenting the image to one or more independent users in a game setting, requesting that the users reorient the image as part of a game in the game setting, and calculating a correction angle based on results of the game. Communicating the image adjustment may include communicating the correction angle to the image capture device.

In another exemplary implementation, receiving the image may include receiving, over the network, the image and image location metadata from the image capture device and determining the image adjustment may include determining the image adjustment based on images stored in an image repository having similar image location metadata.

In another general aspect, a computer program product for performing image adjustments may be tangibly embodied on a computer-readable medium and including executable code that, when executed, is configured to cause a data processing apparatus to receive, over a network, an image from an image capture device, determine an image adjustment to the image and communicate, over the network, the image adjustment to the image capture device.

Implementations may include one or more of the following features. For example, the executable code that causes the data processing apparatus to determine the image adjustment may include executable code that, when executed, is configured to cause the data processing apparatus to present the image to one or more independent users, request that the users make an adjustment to the image, and calculate the image adjustment based on the adjustments of the one or more independent users.

In one exemplary implementation, the executable code that causes the data processing apparatus to determine the image adjustment may include executable code that, when executed, is configured to cause the data processing apparatus to present the image to one or more independent users, request that the users reorient the image, and calculate a correction angle based on the reorientations of the image by the one or more independent users. The executable code that causes the data processing apparatus to communicate the image adjustment may include executable code that, when executed, is configured to cause the data processing apparatus to communicate the correction angle to the image capture device.

In another exemplary implementation, the executable code that causes the data processing apparatus to determine the image adjustment may include executable code that, when executed, is configured to cause the data processing apparatus to calculate a first correction angle using an image aligner, present the image to one or more independent users, request that the users make an angle adjustment to the image, calculate a second correction angle using the angle adjustments of the one or more independent users, and calculate a final correction angle based on the first correction angle and the second correction angle. The executable code that causes the data processing apparatus to communicate the image adjustment may include executable code that, when executed, is configured to cause the data processing apparatus to communicate the final correction angle to the image capture device.

In another exemplary implementation, the executable code that causes the data processing apparatus to determine the image adjustment may include executable code that, when executed, is configured to cause the data processing apparatus to present the image to one or more independent users in an online game setting, request that the users reorient the image as part of a game in the online game setting, and calculate a correction angle based on results of the game. The executable code that causes the data processing apparatus to communicate the image adjustment may include executable code that, when executed, is configured to cause the data processing apparatus to communicate the correction angle to the image capture device. The executable code that causes the data processing apparatus to determine the image adjustment and to communicate, over the network, the image adjustment to the image capture device may occur in substantially real time.

In another general aspect, a method may include capturing an image using an image capture device, communicating the image over a network from the image capture device to an image server and receiving, at the image capture device, an image adjustment from the image server over the network.

Implementations may include one or more of the following features. For example, receiving the image adjustment may include receiving the image adjustment in substantially real time. The image adjustment may include a correction angle, a line that provides an indication of a correction angle, and/or a correction angle based on an accumulation of reorientation inputs by one or more independent users.

In another general aspect, an apparatus may include an image capture module that is arranged and configured to capture an image, a communication module that is arranged and configured to communicate the image over a network to an image server and that is arranged and configured to receive an image adjustment over the network from the image server and a processor that is arranged and configured to control the image capture module and the communication module and to process the image adjustment received by the communication module.

Implementations may include one or more of the following features. For example, the communication module may receive the image adjustment in substantially real time. The image adjustment may include a correction angle, a line that provides an indication of a correction angle, and/or a correction angle based on an accumulation of reorientation inputs by one or more independent users.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

This document describes systems and techniques for providing image feedback. Such techniques may include capturing an image on an image capture device and sending the captured image over a network. The image may be presented to multiple independent users, who are asked to provide image adjustments or other feedback related to the image. The image adjustments and the other feedback are accumulated and communicated over the network to the image capture device. The capturing of the image, accumulating the image adjustments and other feedback from the independent users and sending the image adjustments and feedback to the image capture device may be completed in a very short period of time in substantially real time. For example, image adjustments and the feedback may be returned to the image capture device almost immediately after a user has captured the image of the subject with the image capture device. In this manner, for instance, the user receives immediate feedback on the digital picture just taken and can decide whether to accept the image adjustments to the image, as suggested by the independent users, and/or can take a new digital picture of the subject taking into account the feedback provided by the independent users. A confidence level related to the image adjustment and/or the other feedback may be provided to the image capture device so that the user has an indication as to the level of confidence in the corrections and suggestions being made by the independent users. For instance, a higher confidence level may be provided if the image was presented to a large number of independent users and the users had a uniformly consistent adjustment to the image.

Figure 1:
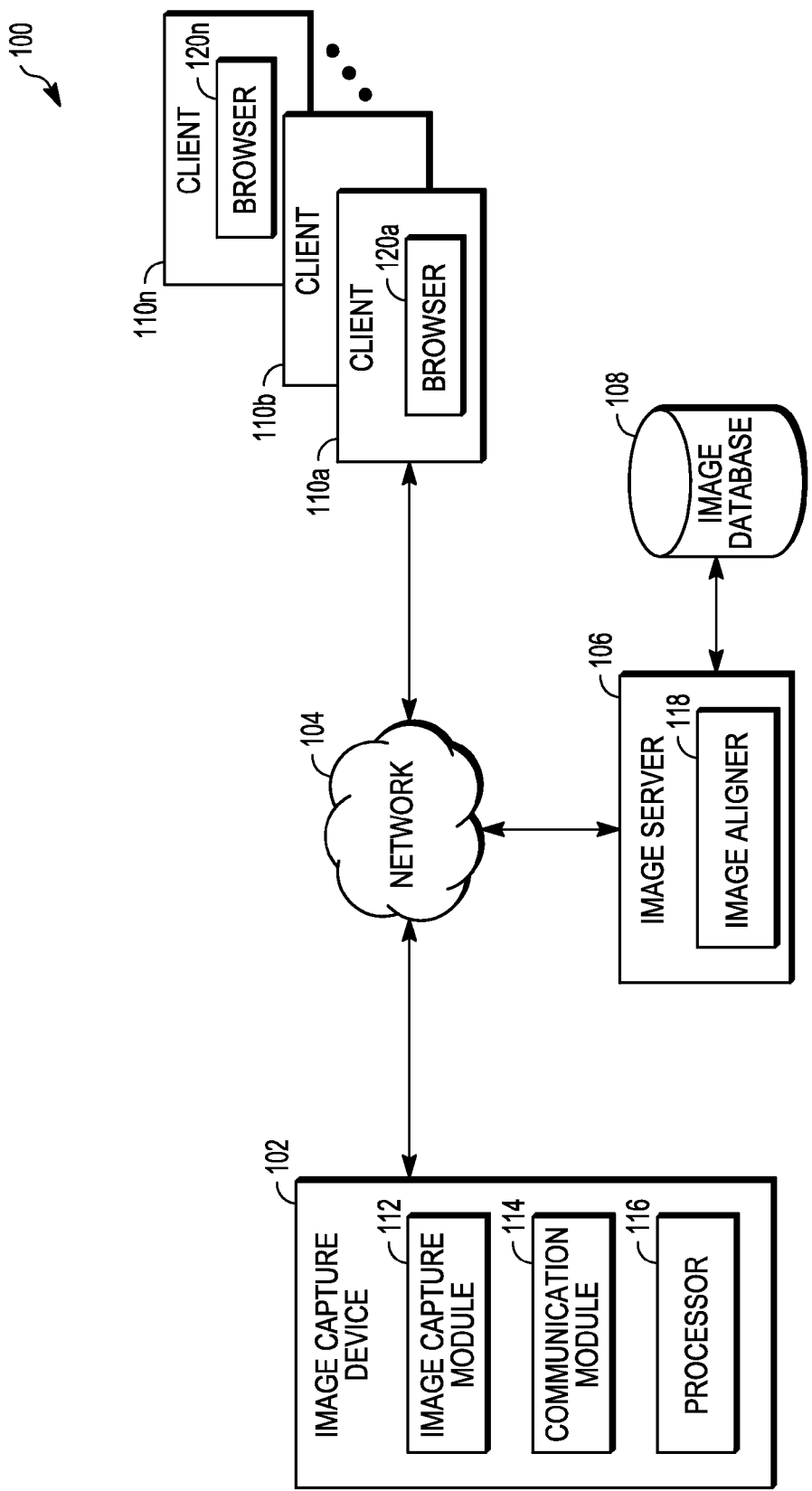
FIG. 1 is an exemplary block diagram of a system for providing image feedback.

FIG. 1 is a block diagram of a system 100 for providing image feedback. In general, an image capture device captures an image, communicates the image over a network to other independent users, who provide adjustments to the image and/or other feedback, which is communicated over the network back to the image capture device.

In FIG. 1, the system 100 includes an image capture device 102, a network 104, an image server 106, an image database 108, and multiple clients 110a-110n. The image capture device 102 may include any type of device that is configured to capture an image and to communicate the image over a network. For example, the image capture device 102 may include a digital camera, a cellular phone having a digital camera, a personal digital assistant (PDA) having a digital camera, a scanner, or any type of mobile device that includes a digital camera.

The image capture device 102 may be configured to include an image capture module 112, a communication module 114, and a processor 116. The image capture module 112 may be configured to capture an image. For example, the image capture module 112 may include one or more lenses and an image sensor (e.g., a charge coupled device (CCD), complementary metal oxide semiconductor (CMOS) device or the like) to capture the image. The communication module 114 may be configured to communicate images and other information over the network 104 and may be configured to receive an image adjustment and/or other image feedback from the image server 106. The communication module 114 may include a wired and/or wireless card to enable the communications over the network 104 such that images may be transmitted and information may be received over the network 104 including image adjustment and other image feedback information. The processor 116 may be configured to control the image capture module 112 and the communication module 114 and to process the image adjustments and other image feedback received by the communication module 114.

Network 104 may be any network or combination of networks that can carry data communication. The network 104 may include and type of wired network, wireless network or combination of wired and wireless networks. The network 104 may include, but is not limited to, a local area network (LAN), a wide area network (WAN) such as the Internet and other types and combinations of networks. The network 104 can support protocols and technology including World Wide Web protocols and/or services. Intermediate web servers, gateways, switches, other servers, or other networking components may be provided between components of system 100 depending upon a particular application or environment.

The image server 106 may be configured to receive one or more images from the image capture device 102 and to process and coordinate image adjustments and other image feedback related to the received images. The image server 106 may include a combination of one or more servers that operate in coordination. The image server 106 may include a web server or may be coupled to communicate with a web server at the same or a different location. A web server may include a computing device of hardware and software that is configured to receive HTTP requests and to respond with an HTTP response. The image server 106 also may be configured to communicate using any protocol over the network 104 to transmit data to and receive data from the image capture device 102 and the clients 110a-110n.

The image server 106 may be configured to communicate with the image database 108. The image database 108 may include a repository of images and associated metadata for the images. For example, the image database 108 may include many stored images taken by users and may include metadata for each image including, but not limited to, a date, a time, a GPS location, text and keywords, image capture device settings and other information. The image database 108 may include a repository of images of landmarks (e.g., buildings, bridges, and other landmarks) and related metadata.

Also, the image database 108 may be configured to store images received from the image capture device 102 and any metadata sent along with the images. The image database 108 may be configured to receive and accumulate image adjustment and other image feedback that may be provided by the clients 110a-110n. The image database 108 may be configured to keep track of the image adjustment and other image feedback and to associate that information with the appropriate image.

The image server 106 may include an image aligner 118. In one exemplary implementation, the image aligner 118 may be configured to calculate and to determine a proper orientation for images received from the image capture device 102. In this manner, the image aligner 118 may attempt to determine any image adjustments such as, for example, a correction angle, without any input from other independent users. For instance, the image aligner 118 may calculate the correction angle and communicate the correction angle information back to the image capture device 102.

In another exemplary implementation, the image aligner 118 may be configured to receive the image adjustment information from independent users such as, for example, clients

110*a*-110*n*. The image aligner 118 may process the image adjustments from the independent users and send that information back to the image capture device 102. For example, if the image adjustment is a correction angle to reorient the image, the image aligner 118 may perform statistical analysis on the reorientations received from the clients 110*a*-110*n* and send the information to the image capture device 102 based on the results of the statistical analysis.

Different statistical calculations may be used to determine the image adjustment information that is returned to the image capture device 102 based on the inputs of the independent users. For example, the mean or average for the images may be used and then the standard deviation and variance may be applied to determine if the data remains around the mean/average. In some implementations, statistical tests such as, for example, a t-test, may be used to determine if there is a large enough sample of independent users to make the statistical analysis valid.

In another exemplary implementation, the image aligner 118 may be configured to use a combination of inputs accumulated and analyzed from independent users and machine processing by the image aligner 118. For example, in the case of determining a proper orientation for a received image, the image aligner 118 may calculate and determine what it believes to be the proper orientation for the image. In this manner, the image aligner may calculate a first correction angle to be applied to the image. The image also may be displayed to multiple independent users such as clients 110*a*-110*n* so that the independent users can reorient the image to a proper orientation. In this manner, the accumulated feedback from the independent users may be a second correction angle. The image aligner 118 may analyze the results from the independent users and compare and/or combine the results with its own machine-based analysis to determine the proper orientation for the image. In this manner, the image aligner 118 may calculate a final correction angle that is based on the first correction angle and the second correction angle. The image adjustment information then may be sent back to the image capture device 102 for the user to determine whether or not to accept the provided image adjustment information. In this manner, the final correction angle may be sent back to the image capture device 102.

The clients 110*a*-110*n* may include multiple different computing devices for multiple independent users. The clients 110*a*-110*n* may include any type of computing device including, but not limited to, personal computers, work stations, laptop computers and mobile computing devices such as, for example, PDAs, cellular phones and the like. The clients 110*a*-110*n* may each include multiple different applications to enable the operation of the client including a browser application 120*a*-120*n*.

The clients 110*a*-110*n* may be configured to view one or more images that have been taken by the image capture device 102, sent over the network 104 to the image server 106, where the image server 106 has made the images available for display and viewing by the clients 110*a*-110*n* over the network 104. For example, a user of the image capture device 102 may designate the captured images available for public display and viewing so that the images can be presented to multiple independent users in order to receive image adjustments and/or other image feedback about the captured images. The clients 110*a*-110*n* may access a designated service or a designated website using the respective browsers 120*a*-120*n* to view the images. The clients 110*a*-110*n* may present the images and ask the users to provide image adjustments to the images. For instance, the clients 110*a*-110*n* may present the images and ask the users to reorient the images, if at all, to a proper orientation and to submit the reorientation information. The information submitted by the clients 110*a*-110*n* is sent over the network 104 and accumulated and analyzed by the image aligner 118 of the image server 106. Then, image adjustment information is sent over the network 104 to the image capture device 102.

The process of sending the images from the image capture device 102 to the image server 106 and then to the clients 110*a*-110*n* and receiving the image adjustment feedback back at the image capture device 102 may be a very fast time such that the user may still be focused on the subject of the image. The image adjustment feedback is meant to be received immediately back at the image capture device 102 so that the user can accept the information and actually alter the image on the image capture device 102 and also may have the opportunity to recapture another image of the subject taking into account any feedback or suggestions from the independent users. In this manner, the information is provided back to the image capture device 102 in substantially real time.

In other implementations, the real time information may be sent back to the image capture device 102 and additional information may continue to be accumulated by the image server 106 from the clients 110*a*-110*n*. The accumulated information may be stored in the image database 108 and analyzed to refine the initial real time image adjustments such that the user of the image capture device 102 can later adjust the image based on the refined calculations that may have been revised over a longer period of time and take into account information from additional independent users.

For example, through the clients 110*a*-110*n*, the independent users may provide image adjustment information such as a correction angle, reorientation information, whether or not to shoot the subject in portrait or landscape, lighting information, zoom and wide angle information, and other types of information. The information provided may include suggestions as to a geographic position when shooting the subject.

The information sent back to the image capture device 102 may include different types of image adjustment information and/or suggestions. For instance, if the independent users and/or the image aligner 118 determine a reorientation for the image, then a bordered image may be sent back to the image capture device 102 showing how the image should be reoriented. The user may be asked to accept the reorientation and, if accepted, the image is adjusted on the image capture device 102. Other information may include a corrected image, text suggestions, a list of suggestions including a list of possible reorientations, a menu of suggestions, and the like. For instance, if the image aligner 118 determines that there may be two possible orientations such as upright or sideways, then the suggestions may be sent back in a menu so that the user can select one of the options. Of course, the user may not wish to accept any of the suggestions and may just leave the image as originally captured.

Figure 2A:
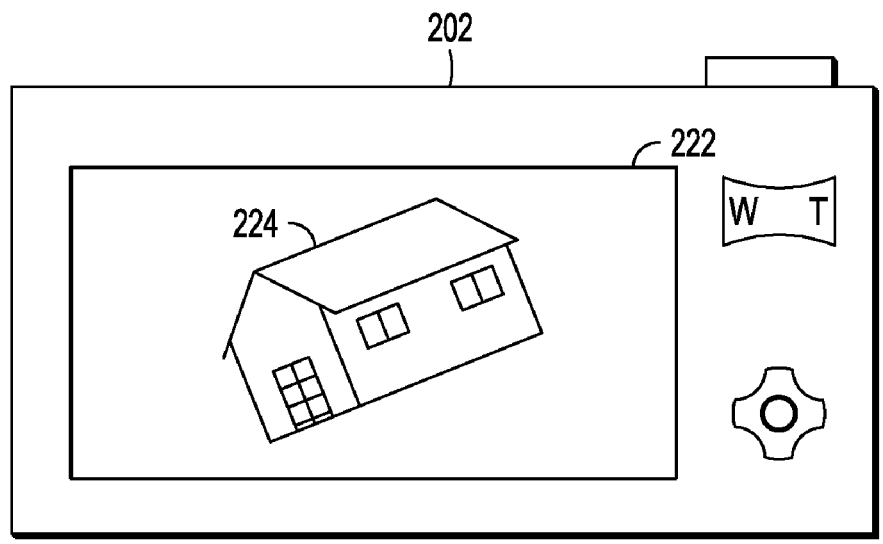
FIG. 2A is an exemplary block diagram of an image capture device capturing an image.

Referring to FIG. 2A, an exemplary image capture device 202 is illustrated. In this example, the image capture device 202 is illustrated as a digital camera. The image capture device 202 includes a display area 222 that is configured to display captured images such as image 224, as well as other information including text and other graphical information. The captured image 224 is taken by the image capture device 202 and is communicated to the image server 106 over the network 104. As discussed above with respect to FIG. 1, the image server 106 may make the image 224 available for display over the network 104 to multiple independent users using clients 110*a*-110*n* asking the independent users to make image adjustments to the image including, but not limited to a reorientation of the image 224. At the same or nearly the same time, the image aligner 118 may perform its own machine analysis on the image 224 to determine, for example, whether or not the image 224 should be reoriented. The users at the clients 110a-110n may access the image 224 using the respective browsers 120a-120n and may make adjustments to the image 224. The image adjustment information is sent from the clients 110a-110n over the network 104 to the image aligner 118, where the image adjustment information is accumulated and analyzed.

Figure 2B:
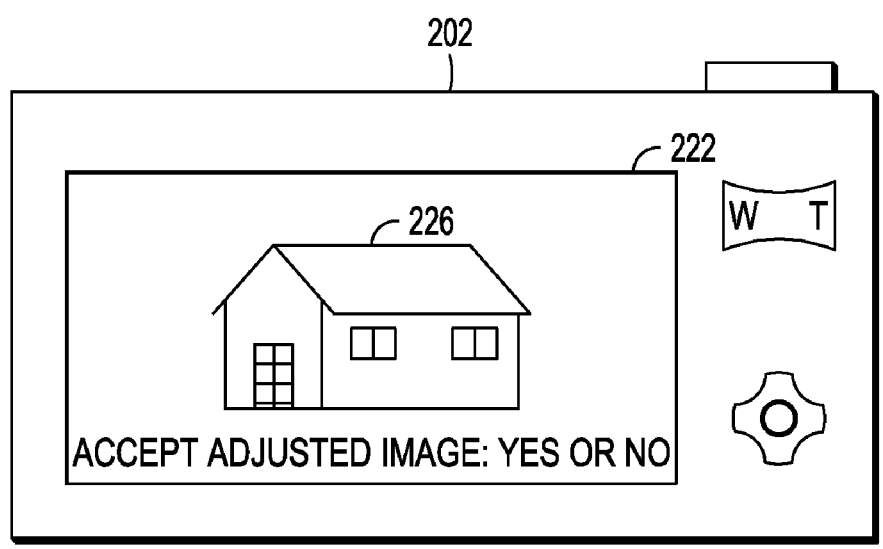
FIG. 2B is an exemplary block diagram of an image capture device receiving image feedback on the captured image from FIG. 2A.

As discussed above, image adjustment information may be sent back to the image capture device 202 based on the independent users input, the machine corrections of the image aligner 118, or a combination of the independent users input and the machine corrections. Referring to FIG. 2B, the exemplary image capture device 202 is illustrated. The display 222 shows the image adjustment information 226 that has been sent by the image server 106 back to the image capture device 202. As one can see from the illustration, the image server 106 has sent back information showing a reorientation of the original image 224 such that it now appears to have been rotated clockwise a number of degrees so that the image appears to be in a proper orientation. The user of the image capture device 202 is given the option of whether or not to accept the image adjustment information 226. If accepted, then the original image 224 may be modified and stored on the image capture device 202 as modified. If not accepted, then the original image 224 may remain on the image capture device 202 but now the user has information that may be used to retake the image and to adjust the digital camera so that a proper orientation of the subject is taken.

FIG. 2B illustrates merely one type of feedback provided from the independent users to the image capture device 202. As discussed above, the image adjustments and feedback may be a line or border on the display 222 that illustrates how the independent users and/or the image aligner 118 think the image 224 should be rotated. Other types of feedback may be provided as well.

In one exemplary implementation, the image 224 may include metadata including GPS information that is sent along with the image over the network 104 to the image server 106. The image server 106 may access similar images from the image database 108 based on the GPS metadata and may compare the image 224 to the previously stored images. The image server 106 may calculate a difference in the GPS locations and, based on the difference, may provide feedback to the image capture device 202 that the user move a specific distance in a specific direction to take a better or different image of the subject. In this manner, users may take advantage of a repository of images and potentially images of landmarks that many users have captured. If many users have captured the image from a particular spot or location, then that information may be used to suggest to the user to move to that location from their current position to take the picture.

Figure 3:
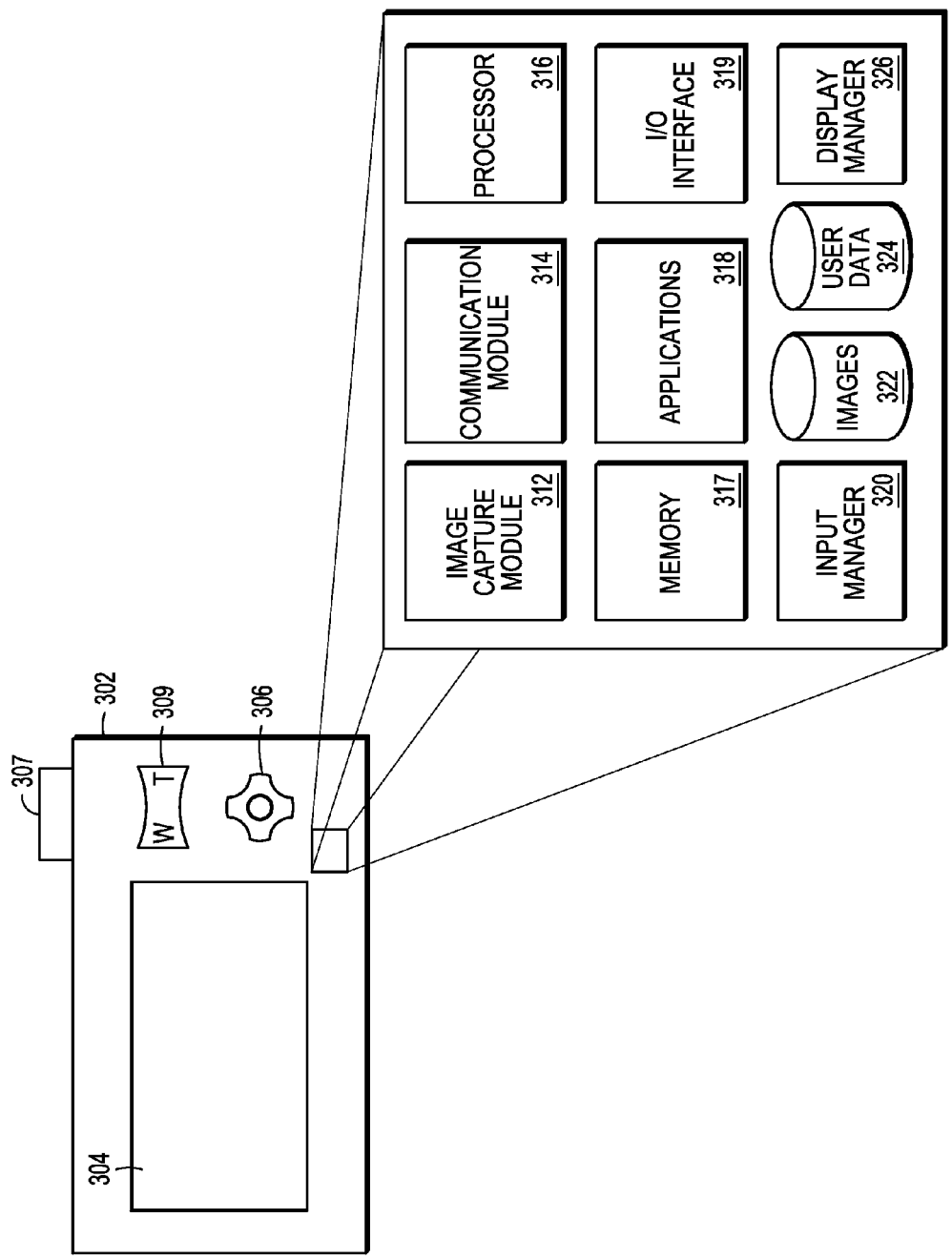
FIG. 3 is an exemplary block diagram of an illustrative image capture device.

FIG. 3 is an exemplary block diagram of an illustrative image capture device 302 for capturing images, sending the images over a network to an image server and receiving image adjustments and/or image feedback in substantially real time. The image capture device 302 may include, as discussed above with respect to image capture devices 102 and 202 of FIGS. 1, 2A and 2B, a digital camera, a cellular phone having a camera, a PDA having a camera, or other device capable of capturing images.

The image capture device 302 includes a display 304 that enables a user to interact graphically with the device using a graphical user interface (GUI) on the display 304. The display 304 may act as an image viewfinder as the user is trying to capture an image of a subject. The display 304 also enables captured images to be displayed and images adjustments and other feedback related to the images to be displayed.

In one example, the display 304 is a touch screen display, so that the user may directly press upon images to manipulate them on the display 304. Input to the device 302 also may be provided using a button interface 306 and a keyboard (not shown) or a phone pad (not shown). The button interface 306 may be configured to enable the user to toggle through various application menus and settings as well as to make selections.

The image capture device 302 may include an image capture button 307 and a lens adjustment button 309. The image capture button 307 may be configured to have different positions (e.g., a halfway depressed position and a fully depressed position) such that one position may focus the lens on a subject and another position may cause the device to capture an image of the focused subject. The lens adjustment button 309 may be configured to adjust the lens between a wide angle position and a zoom position, either by physically or digitally adjusting the lens.

As discussed above with respect to FIG. 1, the image capture device 302 includes an image capture module 312. The image capture module 312 may include one or more applications that enable the device to capture digital images. The device 302 may communicate with other devices or a network through a communication module 314, as discussed above with respect to FIG. 1. The communication module 314 may include a wired and/or a wireless interface. The wireless interface may provide for communication by the device 302 with messaging services such as text messaging, e-mail, and telephone voice mail messaging. In addition, the wireless interface may support downloads and uploads of content and computer code over a wireless network. The wireless interface may additionally provide for voice communications in a wireless network in a familiar manner. As one example, the wireless interface may be used to interact with Internet web pages that are to be displayed on display 304. The wireless interface also may communicate captured image and related metadata over a network and receive image adjustments and other image information from the network.

The image capture device 302 also includes a processor 316, as discussed above with respect to FIG. 1. The processor 316 may execute instructions and coordinate the image capture module 312 and the communication module 314. The processor 316 may execute instructions stored in memory 317, including instructions provided by a variety of applications 318 stored on the device 302. The processor 316 may comprise multiple processors responsible for coordinating interactions among other device components and communications over an I/O interface 319. The processor 316 also may be responsible for managing internal alerts generated by the device 302. For example, the processor 316 may be alerted by the input manager 320 (which may operate on the processor) when a user touches the display 304 or image capture button 307 so as to take the device 302 out of a sleep mode state.

The device 302 also includes memory 322, 324 storing various data. The memory 322, 324 may comprise random access memory where computer instructions and data are stored in a volatile memory device for execution by the processor 316. The memory 322, 324 also may include read-only memory where invariant low-level systems code or data for basic system functions such as basic input and output, and startup instructions reside. In addition, the memory 322, 324 may include other suitable types of memory such as programmable read-only memory, erasable programmable read-only memory, electrically erasable programmable read-only memory, hard disks, and removable memory such as microSD cards or Flash memory.

The memory 322, 324 may, in one example, include image memory 322, which may store captured images and related metadata and user data memory 324, which may story various parameters describing preferences for a user of the device 302. The user data memory 324 may, for example, store and provide ordinary user pass codes, user identifying information (e.g., name, address, telephone numbers, and e-mail addresses), and other such information.

A display manager 326 is provided to supervise and coordinate information to be shown on the display 304. The display manager 326, for example, may be provided with data relating to information to be displayed and may coordinate data received from various different applications or modules. As one example, display manager 326 may receive data for overlapping windows on a windowed display and may determine which window is to be on top and where the lower window or windows is to be cut.

Device inputs such as presses on the touch screen 304 may be processed by the input manager 320. For example, the input manager 320 may receive information regarding input provided by a user on touch screen 304, and may forward such information to various applications or modules. For example, the input manager 320 may cooperate with the display manager 326 so as to understand what onscreen elements a user is selecting when they press on the touch screen 304.

Figure 4A:
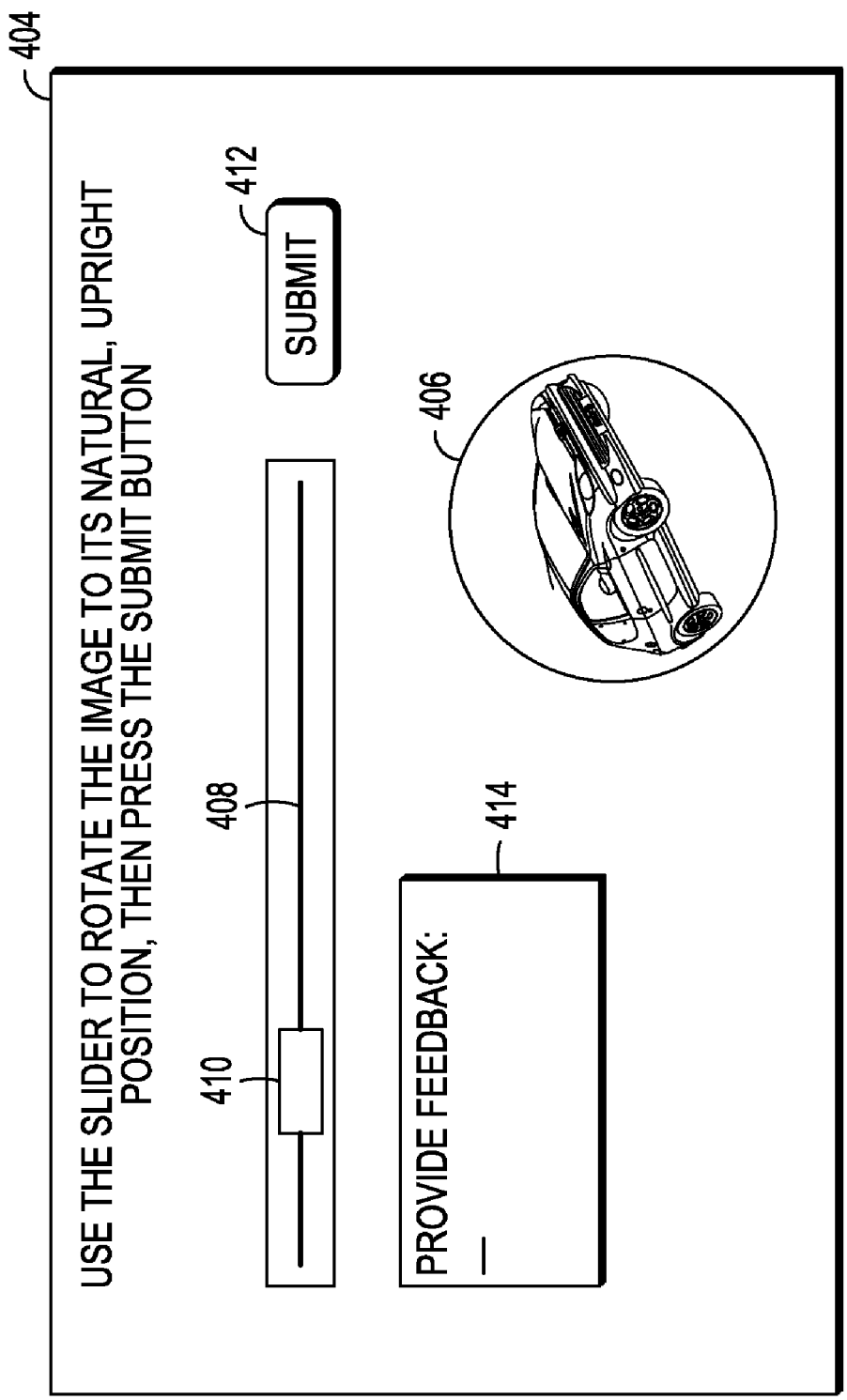
FIG. 4A is an exemplary screen shot of a rotatable CAPTCHA application.

FIG. 4A shows an example screen shot that may be displayed to one or more clients 110a-110n using browsers 120a-120n. In general, an image captured by an image capture device (e.g., image capture device 102 of FIG. 1) may be communicated over a network (e.g., network 104 of FIG. 1) and displayed to multiple independent users such as clients 110a-110n.

The display 404 shows an image 406 as circumscribed in a circle. Such a circumscribing of the image may have been performed by an image server (e.g., the image server 106 of FIG. 1) that provided the image to the clients 110a-110n. In other implementations, the image 406 may not be displayed as circumscribed in a circle, but instead may be displayed in a rectangular or other digital photo format shape.

Several components are displayed to permit appropriate interaction by an independent user with the image 406. For example, instructions may be provided to the user telling the user to rotate the image 406 to an upright position. Such rotation may be performed by the positioning of a slider control 410 located in a slider bar 408. In an initial position, the slider control 410 may be located at the center of the slider bar 408. The slider control 410 may be made active and may be moved by operation of a mouse or by pressing a key at one of the clients 110a-110n. In one exemplary implementation, the slider control 410 and the slider bar 408 are implemented as part of the touch screen. In certain circumstances, such as for the pressing of keys such as, for example, hard keys or soft keys, each selection of the keys may result in the image 406 rotating a set number of degrees. Similarly, the movement of the slider control 410 may result in the image 406 rotating a set number of degrees. When the user has rotated the image 406 to what the user believes is a proper orientation, the user may press a submit button 412 on the display 404. Such selection of the submit button 412 may cause the image adjustment information, such as the angle of rotation, and other feedback to be submitted over the network 104 to the image server 106.

A text box 414 also may be provided so that the independent users at the clients 110a-110n may provide other feedback related to the image, as well. Text or other information may be entered into the text box 414 and the selection of the submit button 412 may cause that information to be sent over the network 104 to the image server 106 as well. The submitted information may be accumulated by the image server 106 and may be communicated back to the image capture device 102 in one form or another.

In one exemplary implementation, the image 406 may be grabbed directly by operation of a mouse or other input device controlling a pointer or cursor. The image 406 may be grabbed and rotated to a proper orientation and the information submitted to the image server 106 upon selection of the submit button 412.

In one exemplary implementation, the image 406 may be presented multiple clients 110a-110n in a game setting so that the users can play a game and make adjustments to the image 406 at the same time. For example, the image 406 may be presented to multiple independent users at clients 110a-110n in an online game setting, where as part of the game the image 406 is presented to the users and they are asked to orient the image to a proper orientation so that it is upright. Users may score points if they match the same orientation as their opponent. This presentation of the image 406 to other independent users may be done because humans may be better than machines at determining a proper orientation for an image. Then, this accumulated information provided by humans may be provided back to the image capture device in substantially real time.

Figure 4B:
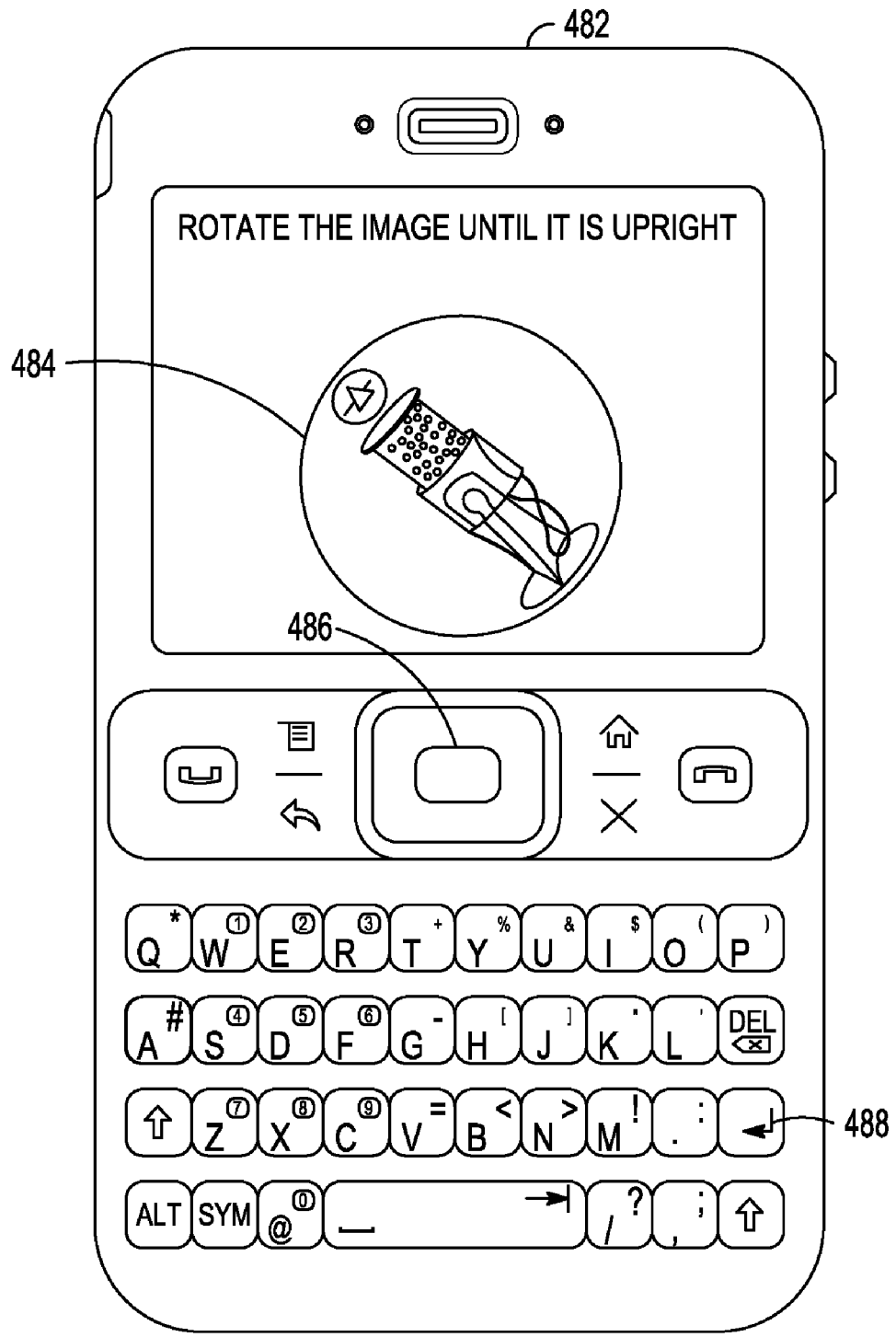
FIG. 4B is an exemplary screen shot of a rotatable CAPTCHA application.

FIG. 4B shows an example screen shot of an image displayed to one of the clients 110a-110n, where the client is a mobile device 482. In this exemplary implementation, the mobile device 482 may include a touch screen display. The image 484 is shown as circumscribed inside a circle. Instructions may be provided telling the user to rotate the image until it is upright. In this example, the image 484 may be rotated by touching the image 484 and moving in either a clockwise or a counter clockwise position. When the image 484 is reoriented to the upright position, the user may select an enter or submit button, such as button 486 or button 488. The submitted reorientation is communicated over the network 104 to the image server 106 so that the image adjustment may be accumulated with other adjustments from other users and ultimately provided back to the image capture device.

Figure 5:
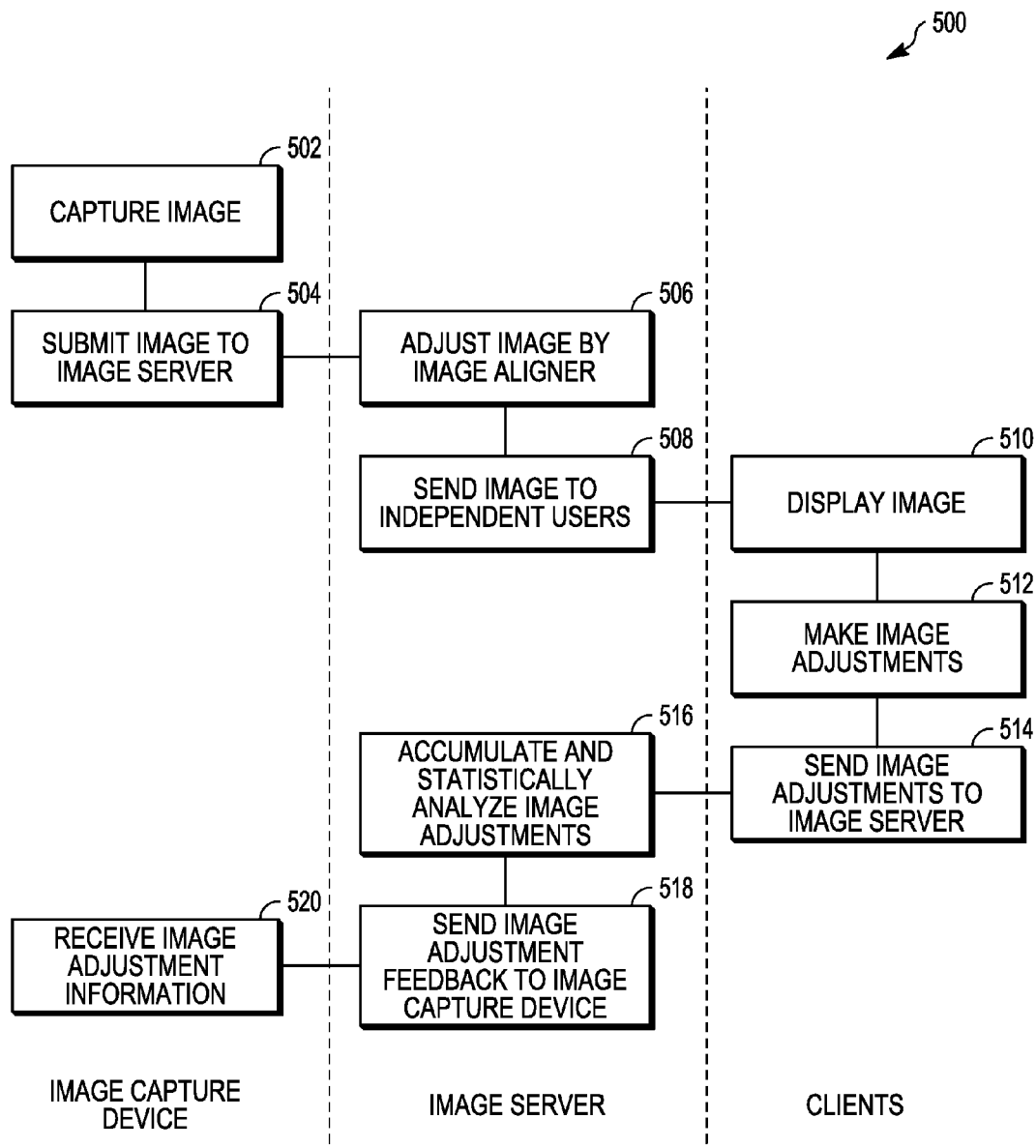
FIG. 5 is an exemplary swim lane diagram of an example process for providing image feedback.

FIG. 5 is a swim lane diagram of an example process 500 for providing image feedback. An image capture device may capture an image (502) and submit the captured image to the image server (504). In this manner, for example, a user of the image capture device may take a digital photo and seek immediate feedback related to the image from one or more independent users. In one exemplary implementation, the image may be adjusted in one or more ways by an image aligner at the image server (506). The image aligner may, for example, attempt to reorient the image without human interaction. The adjustments made by the image aligner may be compared and/or combined with feedback from human interaction with the image. Alternatively, the image aligner may not attempt to make adjustments to the image and the image may only be sent to independent users (508).

The image is displayed to one or more independent users (510). For example, the image may be displayed on the browsers 120a-120n of the clients 110a-110n. The browsers may be on personal computers and/or on mobile computing devices. The users may access the image by browsing to a website that displays images for the purpose of enabling users to make corrections to the images. In one exemplary implementation, the image may be displayed to users as part of a game in an online game setting.

The independent users make image adjustments (512). For example, the users may reorient the image to place the image in a proper orientation. The users may provide other image adjustments such as changing the brightness (e.g., lightening or darkening) the image, adjusting the color of the image, and the like. The image adjustments are sent to the image server from the clients 110a-110n (514). The image server accumulates and statistically analyzes the image adjustments (516). For instance, the image server may use statistical analysis to determine whether there is a valid sample of independent users and to determine the results from the independent users.

In one exemplary implementation, the image aligner may combine the adjustments made by the image aligner (e.g., a first correction angle) with adjustments made by the independent users (e.g., a second correction angle) that results in a combined image adjustment (e.g., a final correction angle). Also, the image aligner may calculate a confidence level for the image adjustment. For instance, different confidence levels may be based on reaching predetermined numbers of independent users. The confidence levels also may be based on the statistical correlation and similarity of the adjustments by the independent users, either alone or in combination with the adjustments calculated by the image aligner.

The image adjustment(s) and/or other image feedback (e.g., confidence level) is sent to the image capture device (518) and the image capture device receives the image adjustment information (520). The image adjustment(s) may be presented to the user on the image capture device in a number of different ways. For example, if there is more than one option or more than one image adjustment, they may be presented on the image capture device as a list or menu of options. The image adjustment may include presenting the image as adjusted and asking for acceptance of the adjust image. If the image adjustment is a reorientation of the image, then a framed border showing the corrected tilt or a horizontal line showing the corrected tilt may be presented. The user of the image capture device may be given the option to accept or reject the image adjustment(s).

The confidence level of the image adjustment also may be received and displayed on the image capture device. In one exemplary implementation, the confidence level may be displayed using a rating system such as, for example, a number of stars. For instance, five out of five stars may indicate the highest level of confidence in the suggested adjustment(s) and one out of five stars may indicate the lowest level of confidence in the suggested adjustment(s). Other rating scales and indicators may be used.

Figure 6:
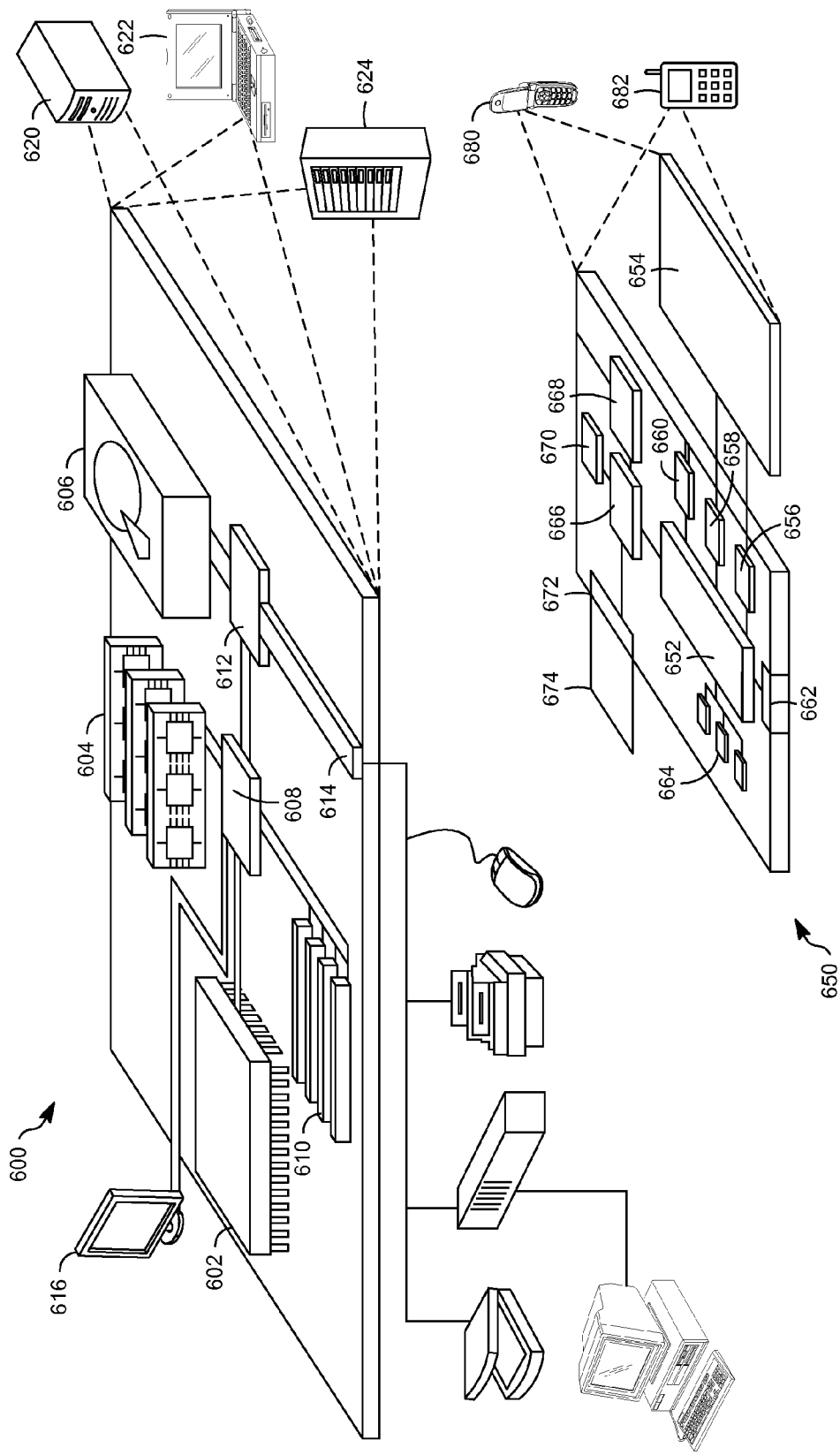
FIG. 6 show an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA 2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
receiving, over a network, an image from an image capture device;
calculating a first correction angle using an image aligner;
presenting the image to one or more independent users;
requesting that the users make an angle adjustment to the image;
calculating a second correction angle using the angle adjustments of the one or more independent users;
calculating a final correction angle based on the first correction angle and the second correction angle; and
communicating, over the network, the final correction angle to the image capture device.

2. The computer-implemented method as in claim 1 wherein receiving the image from the image capture device comprises receiving, over the network, the image from a camera.

3. The computer-implemented method as in claim 1 wherein receiving the image from the image capture device comprises receiving, over the network, the image from a mobile device having a camera.

4. The computer-implemented method as in claim 1 wherein receiving the image from the image capture device comprises receiving, over the network, the image from a scanner.

5. The computer-implemented method as in claim 1 wherein calculating the final correction angle and communicating the final correction angle to the image capture device occurs in substantially real time.

6. The computer-implemented method as in claim 1 wherein:
receiving the image comprises receiving, over the network, the image and image location metadata from the image capture device.

7. A computer program product for performing image adjustments, the computer program product being tangibly embodied on a non-transitory computer-readable medium and including executable code that, when executed, is configured to cause a data processing apparatus to:
receive, over a network, an image from an image capture device;
calculate a first correction angle using an image aligner;
present the image to one or more independent users;
request that the users make an angle adjustment to the image;
calculate a second correction angle using the angle adjustments of the one or more independent users;
calculate a final correction angle based on the first correction angle and the second correction angle; and
communicate, over the network, the final correction angle to the image capture device.

8. The computer program product of claim 7 wherein the executable code that causes the data processing apparatus to calculate the final correction angle and to communicate, over the network, the final correction angle to the image capture device occurs in substantially real time.

9. A method, comprising:
capturing an image using an image capture device;
communicating the image over a network from the image capture device to an image server; and
receiving, at the image capture device, a final correction angle from the image server over the network, wherein the final correction angle is determined by:
calculating a first correction angle using an image aligner,
presenting the image to one or more independent users,
requesting that the users make an angle adjustment to the image,
calculating a second correction angle using the angle adjustments of the one or more independent users, and
calculating the final correction angle based on the first correction angle and the second correction angle.

10. The method as in claim 9 wherein receiving the final correction angle comprises receiving the final correction angle in substantially real time.

11. The method as in claim 9 wherein the final correction angle comprises a line that provides an indication of the final correction angle.

12. An apparatus, comprising:
an image capture module that is arranged and configured to capture an image;
a communication module that is arranged and configured to communicate the image over a network to an image server and that is arranged and configured to receive a final correction angle over the network from the image server; and
a processor that is arranged and configured to control the image capture module and the communication module and to process the image adjustment received by the communication module, wherein the final correction angle is determined by:
calculating a first correction angle using an image aligner,
presenting the image to one or more independent users,
requesting that the users make an angle adjustment to the image,
calculating a second correction angle using the angle adjustments of the one or more independent users, and
calculating the final correction angle based on the first correction angle and the second correction angle.

13. The apparatus of claim 12 wherein the communication module receives the final correction angle in substantially real time.

14. The apparatus of claim 12 wherein the final correction angle comprises a line that provides an indication of the final correction angle.

* * * * *